United States Patent
Fujiwara et al.

(10) Patent No.: US 8,080,763 B2
(45) Date of Patent: Dec. 20, 2011

(54) METHOD OF CONTROLLING ARC WELDING AND WELDING APPARATUS

(75) Inventors: Junji Fujiwara, Osaka (JP); Yasushi Mukai, Osaka (JP); Atsuhiro Kawamoto, Hyogo (JP); Masaru Kowa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/571,106

(22) PCT Filed: Jun. 12, 2006

(86) PCT No.: PCT/JP2006/311730
§ 371 (c)(1),
(2), (4) Date: Dec. 21, 2006

(87) PCT Pub. No.: WO2007/094090
PCT Pub. Date: Aug. 23, 2007

(65) Prior Publication Data
US 2008/0314884 A1  Dec. 25, 2008

(30) Foreign Application Priority Data
Feb. 17, 2006  (JP) ................. 2006-040565

(51) Int. Cl.
*B23K 9/073* (2006.01)
(52) U.S. Cl. ............... 219/130.51; 219/137 R
(58) Field of Classification Search ......... 219/130.51, 219/125.1, 136
See application file for complete search history.

(56) References Cited

U.S. PATENT DOCUMENTS

| 6,627,850 | B1* | 9/2003 | Koga et al. ............ 219/137.71 |
| 2005/0189335 | A1* | 9/2005 | Huismann et al. ....... 219/137.71 |
| 2006/0138115 | A1* | 6/2006 | Norrish et al. .......... 219/137.71 |
| 2007/0024273 | A1 | 2/2007 | Kobayashi |
| 2007/0056944 | A1 | 3/2007 | Artelsmair |
| 2008/0314884 | A1 | 12/2008 | Fujiwara |
| 2009/0026188 | A1 | 1/2009 | Schorghuber |

FOREIGN PATENT DOCUMENTS

| CN | 1344192 A | 4/2002 |
| CN | 1665633 A | 9/2005 |
| EP | 1 182 001 A1 | 2/2002 |

(Continued)

OTHER PUBLICATIONS

Supplementary European Search Report for Application No. EP 06 76 6592, Nov. 5, 2009, Panasonic Corporation. Japanese language International Search Report for PCT/JP2006/311730, dated Dec. 9, 2006.
International Search Report for PCT/JP2010/004619, Oct. 26, 2010.

*Primary Examiner* — Henry Yuen
*Assistant Examiner* — Thien S Tran
(74) *Attorney, Agent, or Firm* — RatnerPrestia (57) ABSTRACT

A wire feeding speed is decreased to a level lower than a base wire feeding speed in a short-circuiting period, and set to the base wire feeding speed in an arcing period. During the arcing period, a welding current is increased to a predetermined peak value by means of current control from the start of arcing to a first predetermined time, the welding current is then supplied with a welding voltage, a source voltage of which is controlled constant, from the first predetermined time to a second predetermined time, and the welding current is decreased to a predetermined base current by means of current control from the second predetermined time until the end of the arcing period.

10 Claims, 9 Drawing Sheets

FOREIGN PATENT DOCUMENTS

| | | |
|---|---|---|
| JP | 60-187468 | 9/1985 |
| JP | 62-006775 A | 1/1987 |
| JP | 2004-298924 A | 10/2004 |
| JP | 2005-528223 A | 9/2005 |
| JP | 2007/508939 A | 4/2007 |
| JP | 2007-216268 A | 8/2007 |
| JP | 2008-542027 A | 11/2008 |
| WO | WO 00/54924 A1 | 9/2000 |
| WO | WO 03/101658 A1 | 12/2003 |

* cited by examiner

METHOD OF CONTROLLING ARC WELDING AND WELDING APPARATUS

This application is a U.S. National Phase Application of PCT International Application PCT/JP2006/311730.

TECHNICAL FIELD

The present invention relates to a method of controlling arc welding which alternately repeats a short-circuiting period and an arcing period while feeding a welding wire, and a welding apparatus of the same.

BACKGROUND ART

Figure 9:
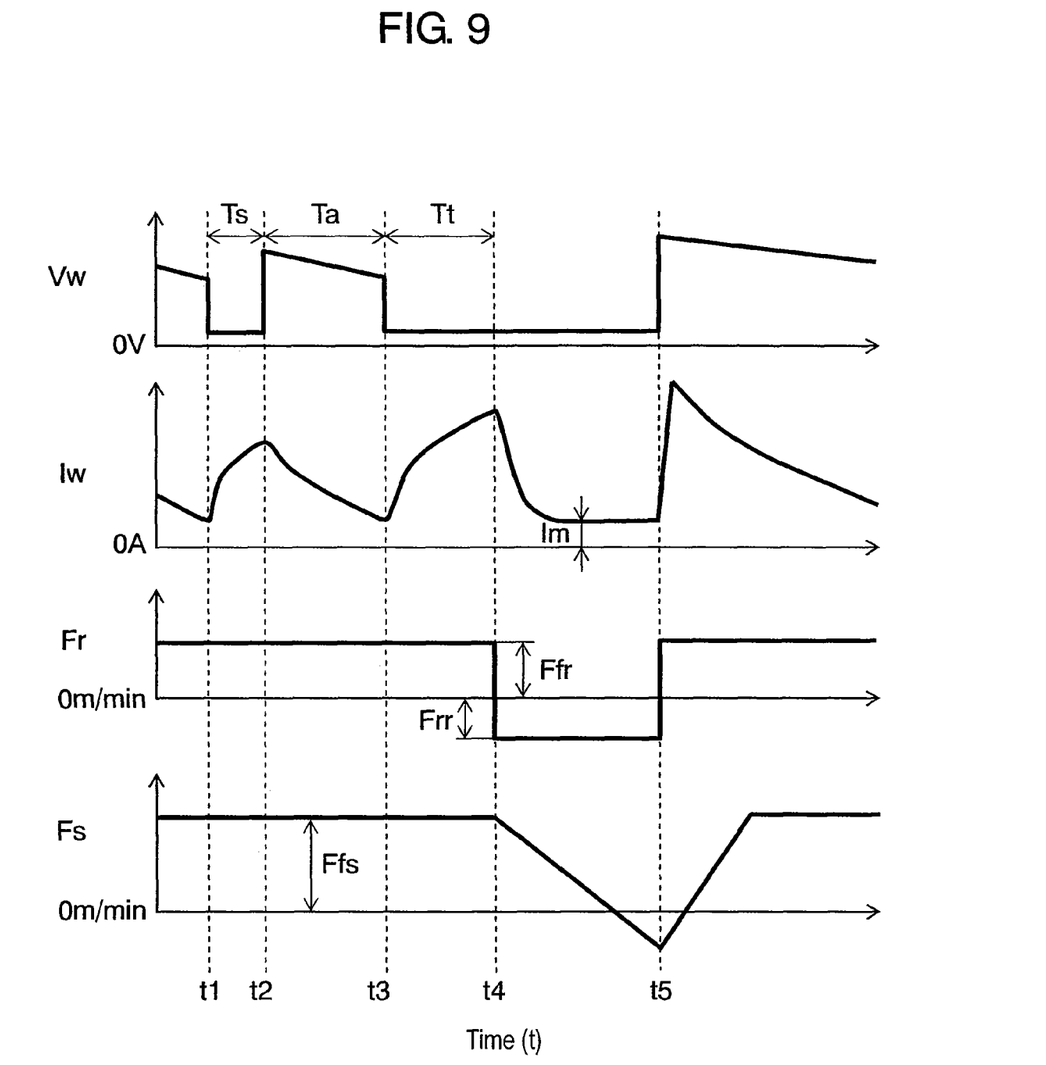
FIG. 9 is a graphic representation showing a conventional method of controlling arc welding.

FIG. 9 shows a conventional method of controlling arc welding. Welding voltage Vw, welding current Iw, speed setting signal Fr for feeding a wire, and feeding speed Fs of a tip of the wire are shown in the figure, as they change with the time respectively. A short-circuiting period Ts between t1 and t2 is shorter than predetermined time period Tt, and signal Fr remains at a level of Ffr for setting forward feeding of the wire, which hence maintains feeding of the wire at a speed of Ffs. The wire is fed continuously at the same speed Ffs in the succeeding arcing period Ta between t2 and t3.

Signal Fr still remains at the level of Ffr in a short-circuiting period commencing from time t3, and the wire is fed at the speed of Ffs until time t4 after an elapse of time Tt from the time t3. At time t4, signal Fr changes to another level Frr for setting withdrawal of the wire, and wire feeding speed Fs begins to decrease at a slope determined by an inertia. At the same time, welding current Iw is reduced to a low level.

Wire feeding speed Fs decreases to below zero, that is, in a reverse movement. At time t5, the wire tip separates from a base metal to break the short circuit, and arcing restarts again. At the same time, signal Fr is switched to the level Ffr, and wire feeding speed Fs starts to increase toward the speed Ffs. Welding current Iw reaches a value corresponding to wire feeding speed Ffs as determined by a constant-voltage characteristic of welding voltage Vw and an arc load.

In the conventional method of controlling arc welding described above, there is a problem in arcing stability because of the presence of the normal short-circuiting period from time t1 to t2 and another short-circuiting period from time t3 to t5, which is much longer than the normal period. Japanese Patent Unexamined Publication, No. 2004-298924, is an example that discloses the above-described conventional method of controlling arc welding.

SUMMARY OF THE INVENTION

The present invention relates to a method of controlling arc welding which alternately repeats a short-circuiting period and an arcing period while feeding a welding wire. In this method, a wire feeding speed is decreased to a lower speed than a base feeding speed in the short-circuiting period, and the wire feeding speed is increased to the base feeding speed in the arcing period. During the arcing period, a welding current is increased to a predetermined peak value by means of current control from the start of arcing to a first predetermined time, the welding current is then supplied with a welding voltage, of which a source voltage is controlled constant, from the first predetermined time to a second predetermined time, and the welding current is decreased thereafter to a base current of a value lower than the peak current by means of current control from the second predetermined time until the end of the arcing period.

REFERENCE MARKS IN THE DRAWINGS

I welding current
V welding voltage
WS wire feeding speed
IP peak current
IB base current
3 switching device
7 driver unit
8 welding voltage detector
9 welding current detector
10 short-circuit/arc detector
11 short-circuit controller
12 arc controller
13 first timing device
14 constant arc current controller
15 constant arc voltage controller
16 wire feeding motor controller
17 wire feeding speed controller
18 second timing device
19 motor ON/OFF controller
20 motor polarity controller
21 wire feeding motor
22 wire
24 arc
25 weld object
26 operation unit

DETAILED DESCRIPTION OF THE PREFERRED EMBODIMENTS

Description is provided hereinafter of exemplary embodiments of the present invention with reference to FIG. 1 to FIG. 8.

First Exemplary Embodiment

Figure 1:
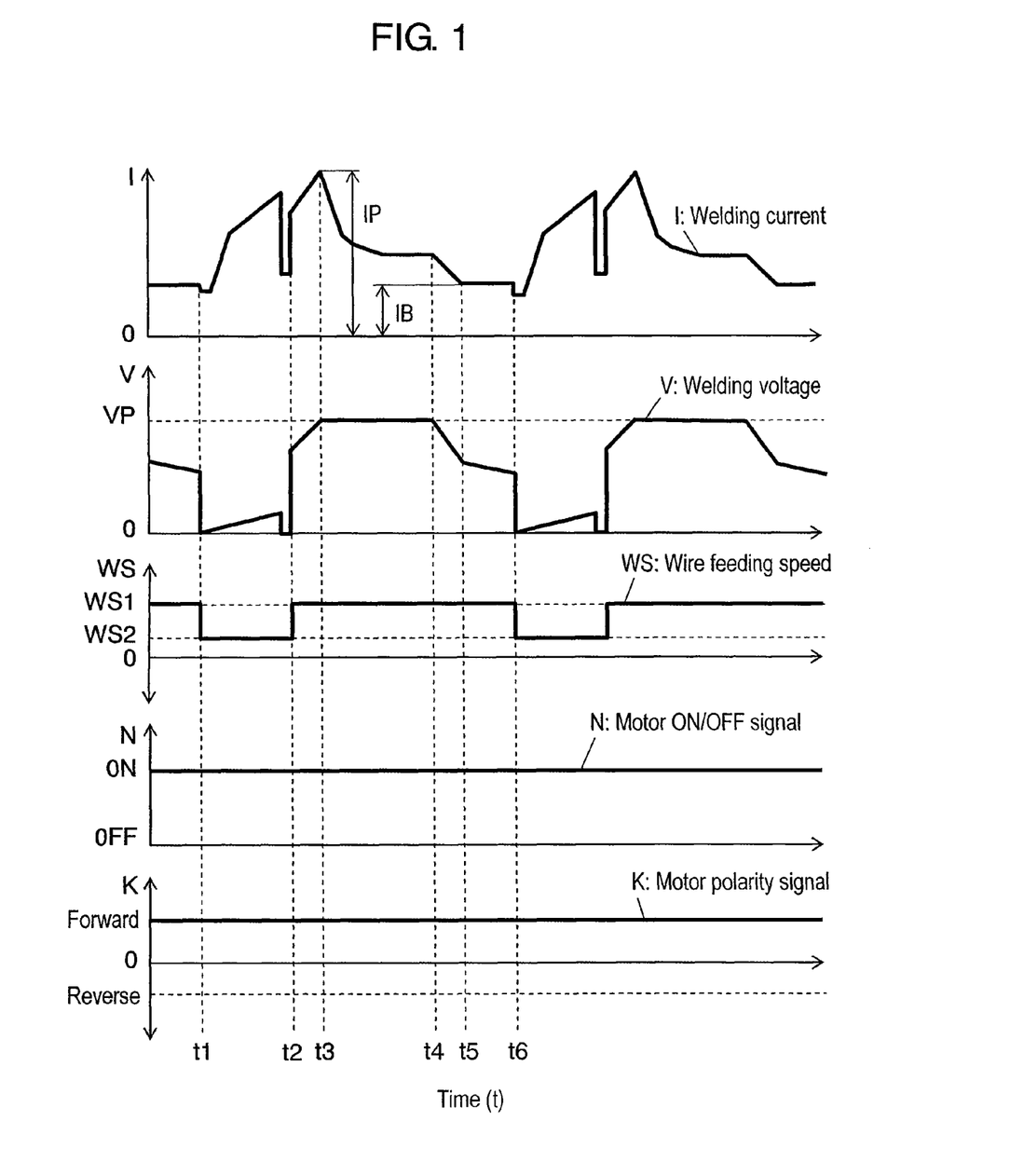
FIG. 1 is a graphic representation showing a method of controlling arc welding according to a first exemplary embodiment of the present invention.

FIG. 1 shows a method of controlling arc welding according to a first exemplary embodiment of this invention. Shown in the figure are welding current I, welding voltage V, wire feeding speed WS, motor ON/OFF signal N for directing to turn on and off of a wire feeding motor, and motor polarity signal K for regulating a rotating direction of the wire feeding motor, as they change with the time respectively.

Welding current I is increased at a predetermined gradient by means of current control in a short-circuiting period from time t1 to time t2. At the same time, wire feeding speed WS is decreased from base feeding speed WS1 to another speed WS2. Welding current I is decreased steeply immediately before the end of the short-circuiting period by detecting a tapering of melted welding wire.

From time t2 to time t3 in an arcing period, welding current I is increased at a predetermined gradient by means of current control until it reaches peak current IP of a value determined separately. After welding current I reaches the value of peak current IP, it is maintained at this level until time t3. Wire feeding speed WS is also reset to WS1 from WS2.

Although the value of peak current IP is 200 A or higher, it is desirable to experimentally determine a suitable value for an object to be welded. If the value of peak current IP is too low, it tends to produce tiny short circuits, which cause spatters, or it deepens a molten pool if the value is too high. It is therefore necessary to control welding current I accurately.

At time t2, or immediately after the start of arcing, however, the arc can blaze up easily to avoid tiny short circuits even if peak current IP is not increased excessively since wire feeding speed WS is still at a low speed in the neighborhood of WS2.

From time t3 to time t4 in the arcing period, welding voltage V is controlled to be constant at a value of base welding voltage VP, and welding current I shown in the figure is supplied by using a source of this constant voltage. Since use of the constant voltage control provides an advantage of maintaining a proper arc length stably, tiny short circuits are hardly to occur.

From time t4 to time t5 in the arcing period, welding current I is decreased by means of current control at a predetermined gradient until it reaches base current IB of a value determined separately. When base current IB is 100 A or less, spatters of large particles are hardly produced even if tiny short circuits occur. The manner in which welding current I is decreased at the predetermined gradient can reduce an abrupt change in the state of arcing. It is desirable to experimentally determine a suitable value of base current IB for the object to be welded.

From time t5 to time t6 in the arcing period, welding current I is kept at the level of base current IB to maintain until time t6 such a condition that can be turned easily into the next state of short-circuiting period.

The above short-circuiting period and the arcing period are repeated alternately in the method of controlling arc welding according to this exemplary embodiment.

Figure 2:
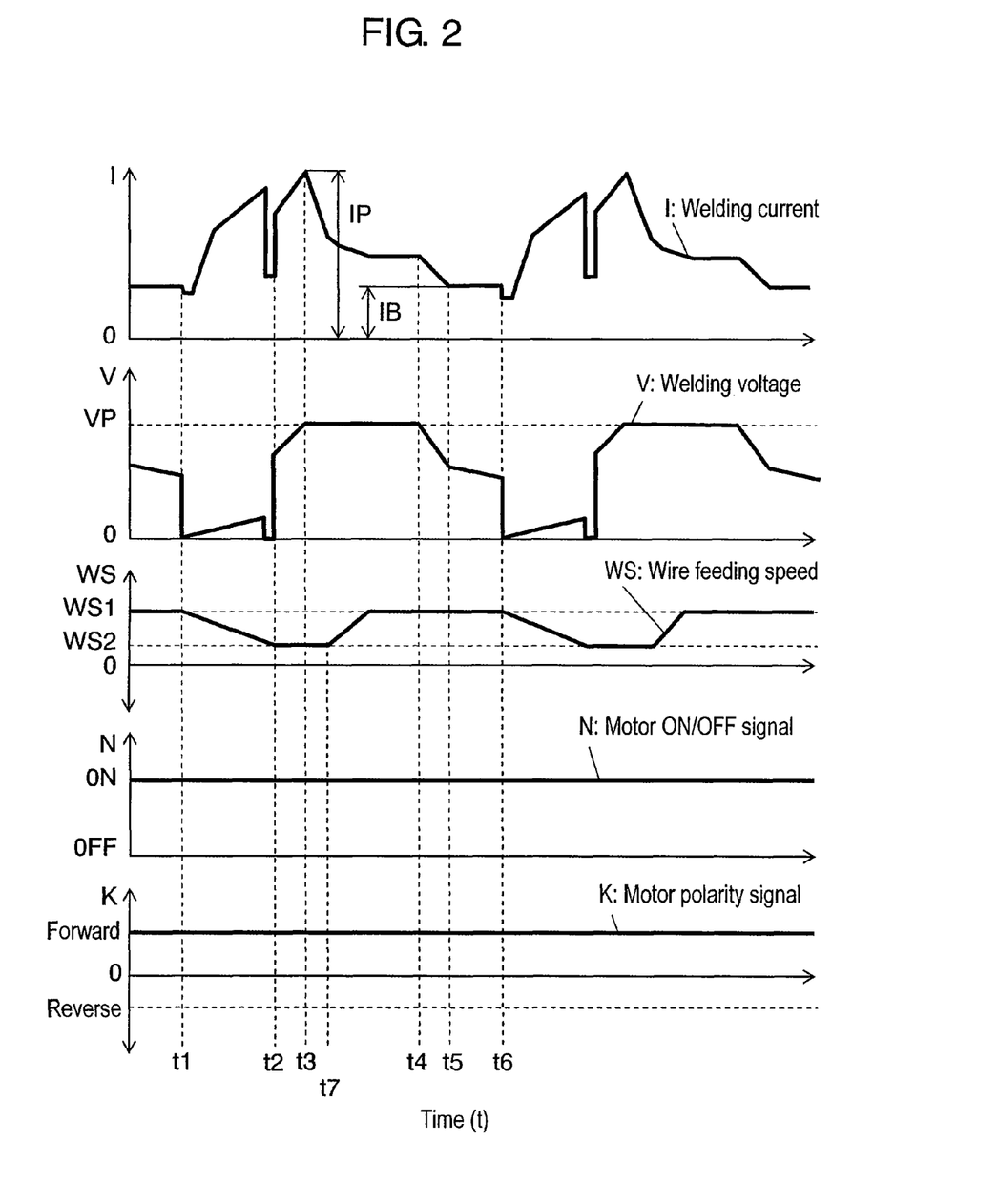
FIG. 2 is a graphic representation similar to FIG. 1 except for a change in a wave form of wire feeding speed WS.

Here, description is provided of a gradient and a delay time adopted for changing wire feeding speed WS. Wire feeding speed WS can be decelerated to WS2 from base feeding speed WS1 at a predetermined gradient as shown in FIG. 2. An abrupt change in wire feeding speed WS can be suppressed in this manner.

Figure 3:
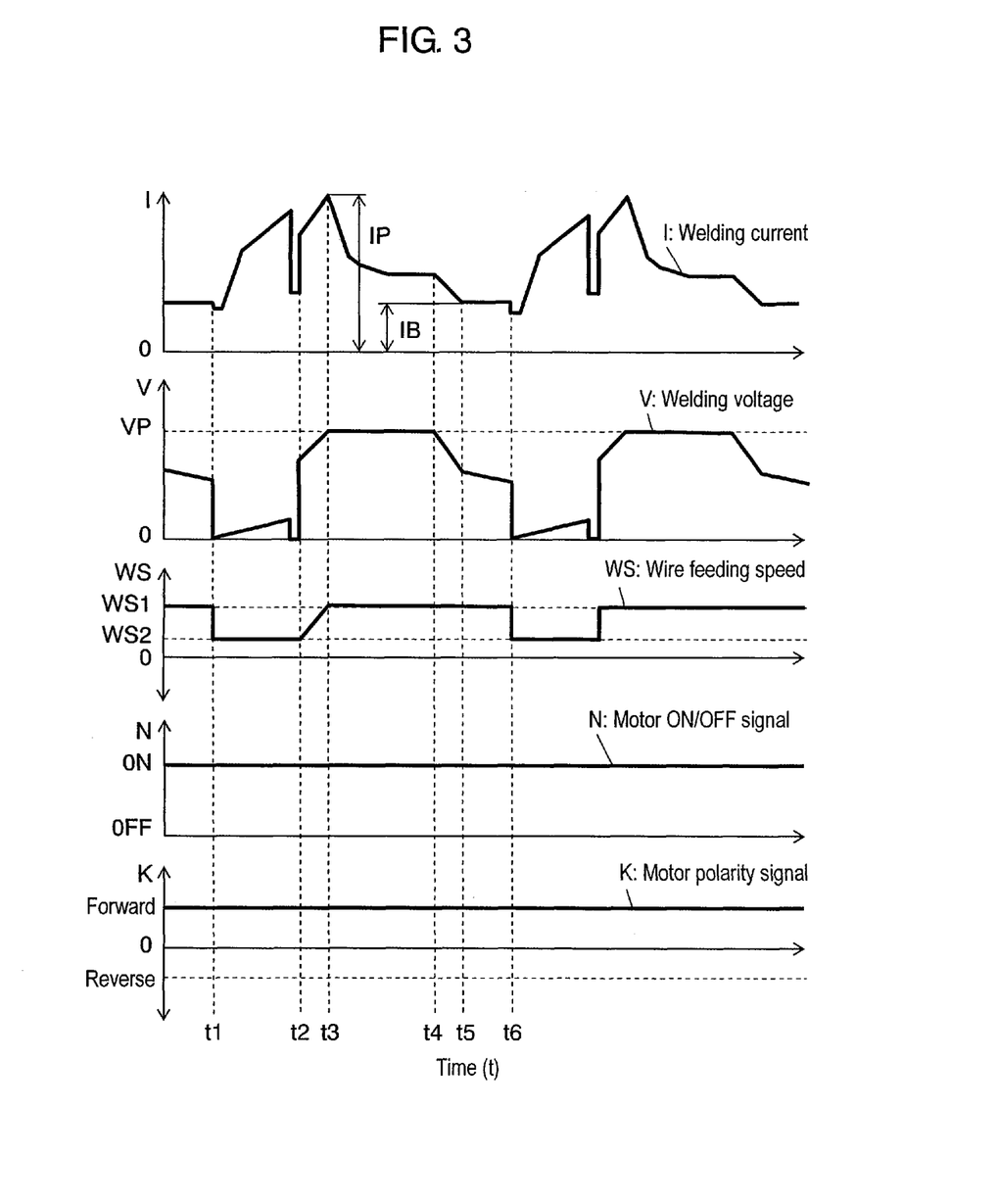
FIG. 3 is another graphic representation similar to FIG. 1 except for a change in the wave form of wire feeding speed WS.

It is also possible to accelerate wire feeding speed WS from WS2 to WS1 at a predetermined gradient as shown in FIG. 3. This can suppress an abrupt change in the state of arcing, and reduce a possibility of tiny short circuits likely to occur immediately after the start of arcing.

In addition, it is possible to delay the start of acceleration for a predetermined time from time t2 to time t7, as shown in FIG. 2, when wire feeding speed WS is increased from WS2 to WS1. Since wire feeding speed WS is kept at a low speed of WS2 during the delay time, peak current IP needs not be increased excessively to blaze up the arc, thereby reducing the possibility of tiny short circuits.

Figure 4:
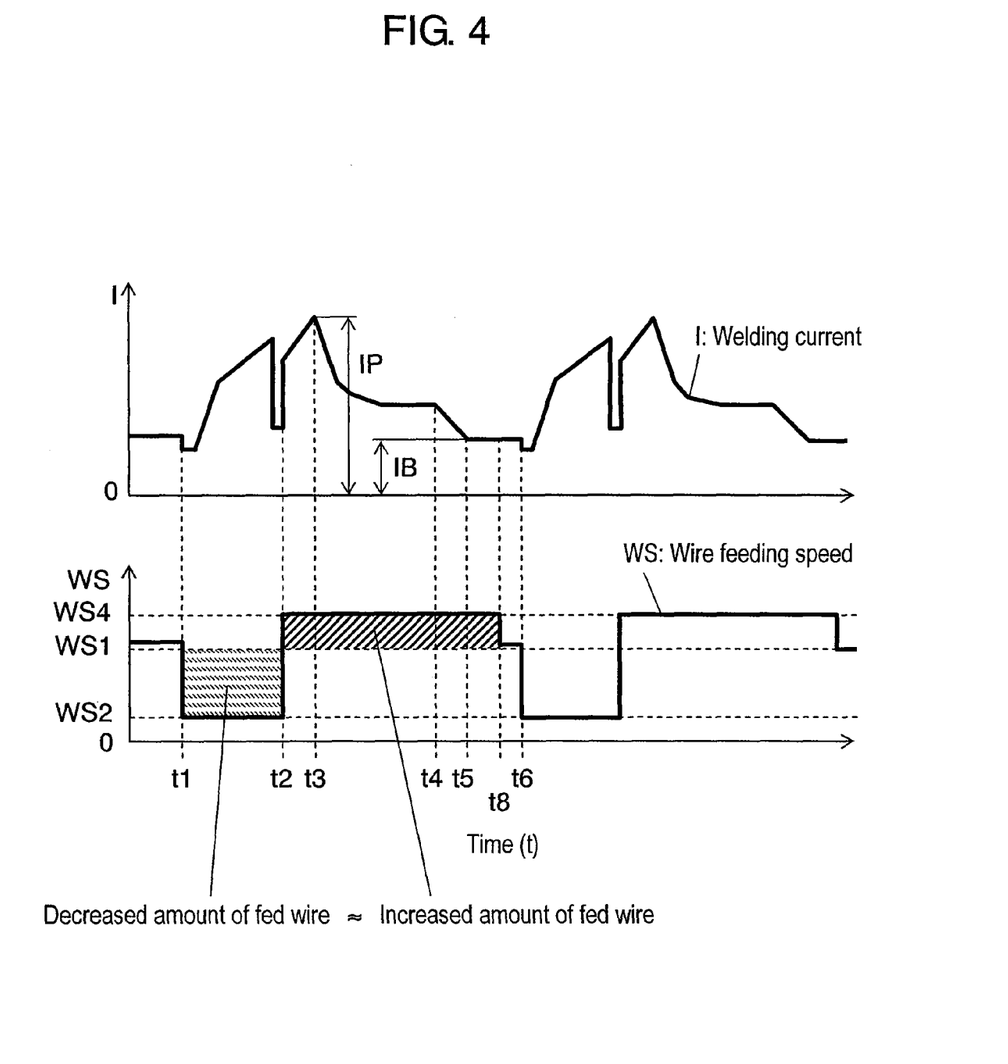
FIG. 4 is a graphic representation showing a method of offsetting a feeding amount of a wire.
Figure 5:
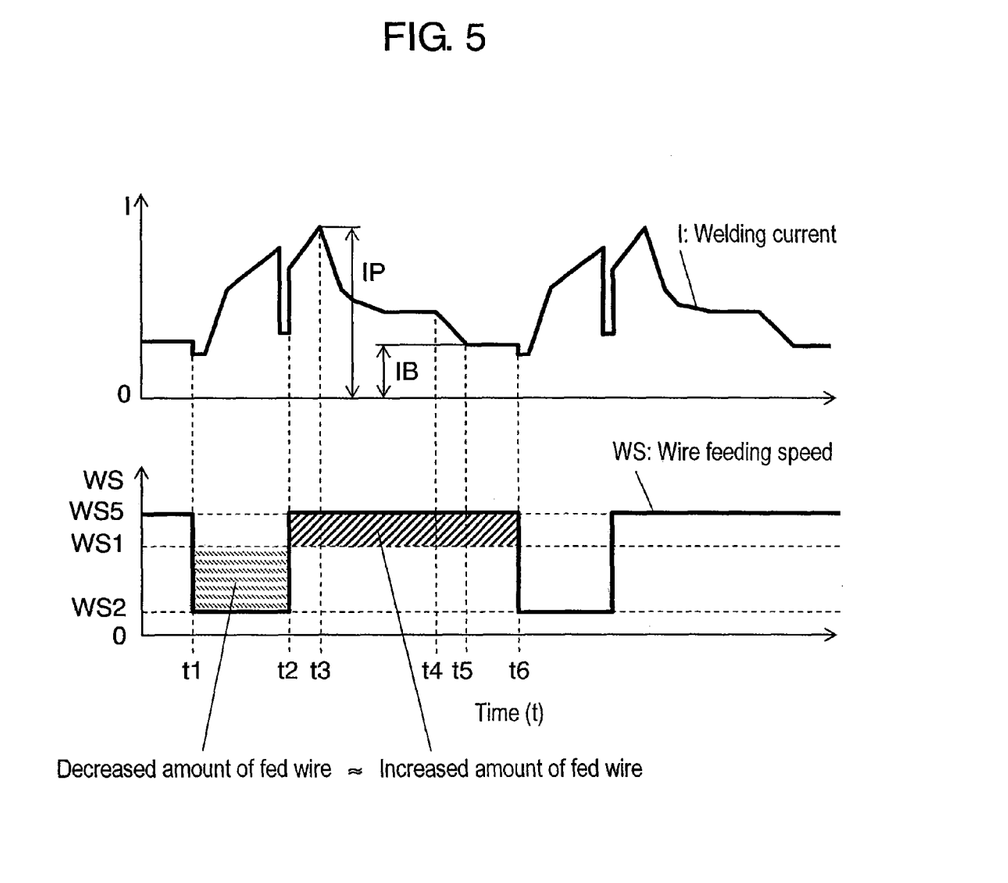
FIG. 5 is a graphic representation showing another method of offsetting a feeding amount of the wire.

Description is provided next of a manner of offsetting feeding amount of the wire. As shown in FIG. 4 and FIG. 5, wire feeding speed WS is reduced to WS2, a speed lower than base feeding speed WS1, during the short-circuiting period from time t1 to time t2, and wire feeding speed WS is increased to either WS4 or WS5 of a higher speed than WS1 during the arcing period from time t2 to time t6. An amount of the wire fed during the short-circuiting period decreases because wire feeding speed WS is lowered, whereas an amount of the wire fed during the arcing period increases because wire feeding speed WS is raised. It is important to provide a stable feeding in amount of the wire independently of a change in number of short-circuiting by offsetting the decreased amount of fed wire with the increased amount in order to obtain a good welding quality.

FIG. 4 shows a first method of offsetting, in which a decreased amount of fed wire is calculated first in the short-circuiting period between time t1 and time t2. During the arcing period from time t2 to time t6, an increased amount of the fed wire is calculated in real time while feeding the wire at a speed of WS4, and wire feeding speed WS is decelerated to WS1, when the increased amount of the fed wire becomes equal to the decreased amount at time t8. It is desirable to experimentally determine an appropriate value of the wire feeding speed WS4.

FIG. 5 shows a second method of offsetting, which is to determine wire feeding speed WS5 appropriate to offset a decreased amount and an increased amount of the fed wire based on a time data of previous arcing periods such as a duration of the preceding arcing period, an average duration of a plurality of the preceding arcing periods, etc., in combination with the decreased amount of the fed wire in the short-circuiting period from time t1 to time t2.

Figure 6:
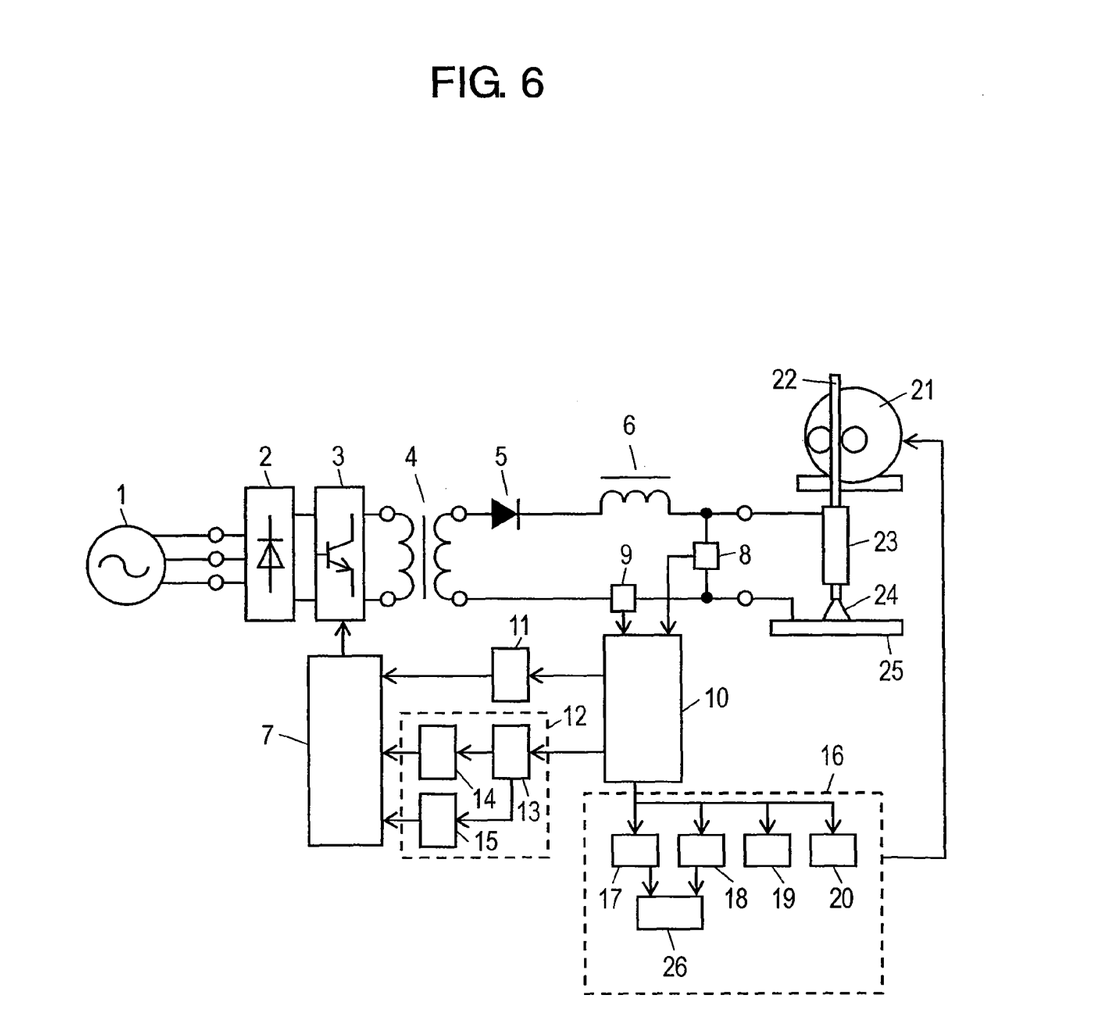
FIG. 6 is a schematic diagram of an arc welding apparatus according to first to third exemplary embodiments of the present invention.

FIG. 6 shows an arc welding apparatus according to this exemplary embodiment. AC voltage 1 is rectified by rectifier 2. The rectified voltage is delivered through switching device 3, transformer 4, rectifier 5 and DC reactor 6, and impressed as a welding voltage between welding wire 22 and weld object 25 to weld them. Current detector 9 detects the welding current.

Short-circuit/arc detector 10 determines whether the welding process at the moment is in the short-circuiting period or the arcing period, based on the welding voltage detected by welding voltage detector 8.

Wire feeding motor controller 16 comprises wire feeding speed controller 17, second timing device 18, motor ON/OFF controller 19, motor polarity controller 20, and operation unit 26.

When short-circuit/arc detector 10 determines it as being in a short-circuiting period, wire feeding speed controller 17 gives a command for wire feeding speed of WS2. Motor ON/OFF controller 19 then gives an ON command if wire feeding speed WS2 is greater than zero (i.e., WS2>0), and motor polarity controller 20 gives a forward command. Motor ON/OFF controller 19 gives an OFF command if WS2 equals zero (i.e., WS2=0), and motor polarity controller 20 gives a forward command. Motor ON/OFF controller 19 gives an ON command if WS2 is smaller than zero (i.e., WS2<0), and motor polarity controller 20 gives a reverse command.

When short-circuit/arc detector 10 determines it as being in an arcing period, wire feeding speed controller 17 gives a command for wire feeding speed of WS1. Motor ON/OFF controller 19 then gives an ON command, and motor polarity controller 20 gives a forward command.

With regard to the above method of offsetting a decreased amount and an increased amount of the fed wire (refer to FIGS. 4 and 5), operation unit 26 calculates the decreased amount of fed wire during the short-circuiting period in the case of FIG. 4. Operation unit 26 further calculates the increased amount of the fed wire in real time during the arcing period, and gives a command for setting back the wire feeding speed to WS1 when the increased amount and the decreased amount become equal in value.

In the case of FIG. 5, operation unit 26 calculates the decreased amount of fed wire during the short-circuiting period. Operation unit 26 then calculates a value of wire feeding speed WS5 based on the time data of the previous arcing periods and the above decreased amount of the fed wire, and gives a command accordingly.

Wire feeding motor 21 feeds the wire according to the command from wire feeding motor controller 16. Timing device 18 counts a delay time if acceleration of the wire feeding speed needs to be delayed.

Short-circuit controller 11 controls the welding current I during the short-circuiting period. During the arcing period, on the other hand, arc controller 12 controls any of the welding current I and the welding voltage V. Arc controller 12 comprises first timing device 13, current controller 14, and voltage controller 15. Timing device 13 counts individual points of time shown in FIG. 1. Current controller 14 controls welding current I for the periods between times t2 and t3 and also between times t4 and t6. Voltage controller 15 controls welding voltage V for the period between times t3 and t4. Driver unit 7 controls switching device 3 according to a signal from any of short-circuit controller 11 and arc controller 12.

Second Exemplary Embodiment

Figure 7:
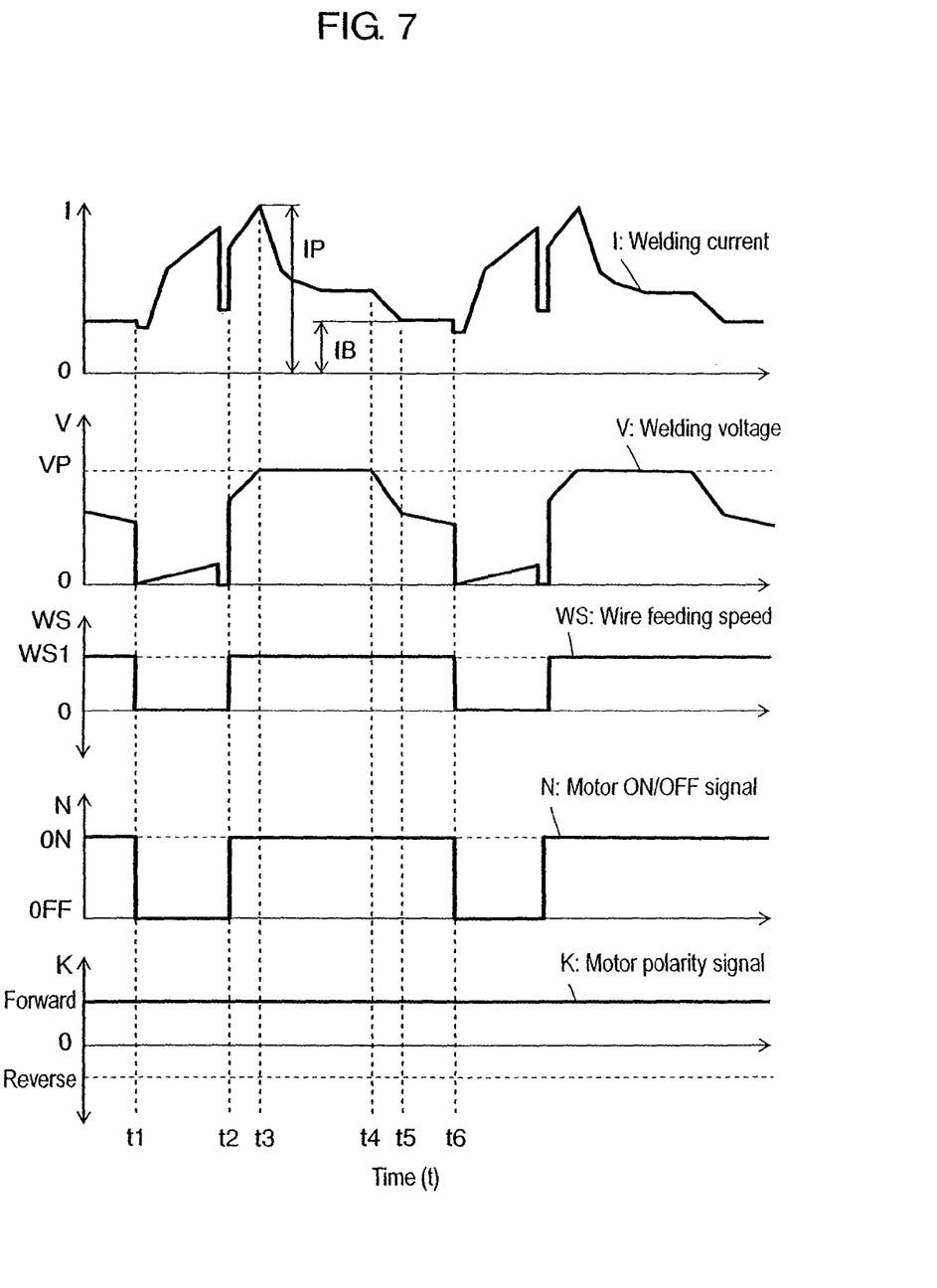
FIG. 7 is a graphic representation showing a method of controlling arc welding according to a second exemplary embodiment of the present invention.

FIG. 7 shows a method of controlling arc welding according to a second exemplary embodiment of this invention. Shown in this figure are welding current I, welding voltage V, wire feeding speed WS, motor ON/OFF signal N for directing to turn on and off of a wire feeding motor, and motor polarity signal K for regulating a rotating direction of the wire feeding motor, as they change with the time respectively.

This method differs from that of the first exemplary embodiment in respect that wire feeding speed WS is brought to zero, that is, feeding of the wire is stopped during a short-circuiting period from time t1 to time t2. All other functions remain analogous to the first exemplary embodiment (refer to FIG. 1).

Wire feeding speed WS can be changed at a predetermined gradient in the same manner as the first exemplary embodiment (refer to FIGS. 2 and 3). In addition, a timing of changing wire feeding speed WS can be delayed as well (refer to FIG. 2).

It is also possible to offset a decreased amount and an increased amount of feeding the wire in the same manner as the first exemplary embodiment (refer to FIGS. 4 and 5).

An arc welding apparatus used in this exemplary embodiment is identical to that described in the first exemplary embodiment.

The method of controlling arc welding of this exemplary embodiment has an advantage of further reducing a number of tiny short circuits at the start of arcing as compared to the first exemplary embodiment since wire feeding speed WS is brought to zero during the short-circuiting period. This method can also melt the wire sufficiently to generate arcing within a shorter short-circuiting period.

Third Exemplary Embodiment

Figure 8:
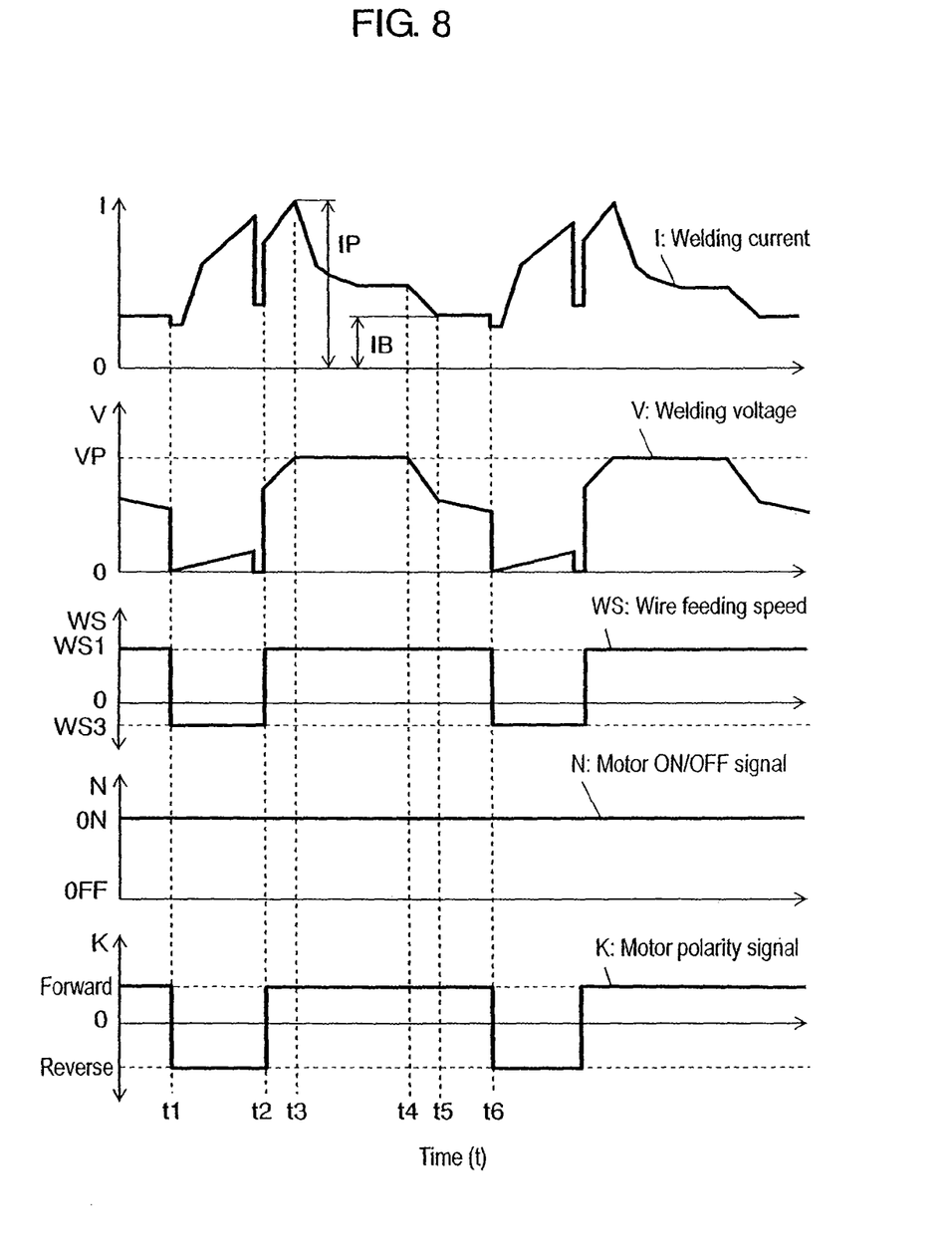
FIG. 8 is a graphic representation showing a method of controlling arc welding according to a third exemplary embodiment of the present invention.

FIG. 8 shows a method of controlling arc welding according to a third exemplary embodiment of this invention. The figure shows welding current I, welding voltage V, wire feeding speed WS, motor ON/OFF signal N for directing to turn on and off of a wire feeding motor, and motor polarity signal K for regulating a rotating direction of the wire feeding motor, as they change with the time respectively.

This method differs from that of the first exemplary embodiment in respect that wire feeding speed WS is reversed to a backward direction during a short-circuiting period from time t1 to time t2. All other functions remain analogous to the first exemplary embodiment (refer to FIG. 1).

Wire feeding speed WS can be changed at a predetermined gradient in the same manner as the first exemplary embodiment (refer to FIGS. 2 and 3). In addition, a timing of changing wire feeding speed WS can be delayed as well (refer to FIG. 2). It is also possible to offset a decreased amount and an increased amount of fed wire in the same manner as the first exemplary embodiment (refer to FIGS. 4 and 5).

An arc welding apparatus used in this exemplary embodiment is identical to that described in the first exemplary embodiment.

The method of controlling arc welding of this exemplary embodiment has an advantage of further reducing a number of tiny short circuits at the start of arcing as compared to any of the first and the second exemplary embodiments since wire feeding speed WS is changed to the backward direction during the short-circuiting period. This method can also melt the wire sufficiently to generate arcing within a shorter short-circuiting period.

INDUSTRIAL APPLICABILITY

The method of controlling arc welding of the present invention is industrially useful for application to arc welding apparatuses as well as the method for controlling the same because of its advantage of reducing spatters.

The invention claimed is:

1. A method of controlling arc welding which repeats a process having a short-circuiting period and an arcing period, the method comprising the steps of: feeding a welding wire in the short-circuiting period and the arcing period; decreasing a wire feeding speed to a first constant speed lower than a base feeding speed in the short-circuiting period; increasing the wire feeding speed to a second constant speed higher than the base feeding speed in the arcing period; increasing a welding current to a predetermined peak value by means of current control from the start of arcing to a first predetermined time during the arcing period; supplying the welding current by using a welding voltage controlled to be constant from the first predetermined time to a second predetermined time; and decreasing the welding current to a value of base current lower than the peak current by means of current control from the second predetermined time until the end of the arcing period, increasing the wire feeding speed in the arcing period of the process to an extent so that an increased amount of the wire fed during the arcing period relative to an amount of the wire fed at the base feeding speed becomes equal to a decreased amount of the wire fed during the short-circuiting period of the process relative to an amount of the wire fed at the base feeding speed, and determining the second constant speed of an arcing period of the process currently performed based on the decreased amount of the wire fed during the short-circuiting period of the process currently performed and a time duration of at least one previous arcing period of the arcing periods of the process previously executed.

2. The method of controlling arc welding in claim 1, wherein the wire feeding speed is brought to zero in the short-circuiting period.

3. The method of controlling arc welding in claim 1, wherein the wire feeding speed is changed to a reverse direction in the short-circuiting period.

4. The method of controlling arc welding in claim 1, wherein the wire feeding speed is accelerated after a delay of a predetermined time from the start of arcing in the arcing period.

5. The method of controlling arc welding in claim 1, wherein the welding current is decreased to the value of base current after an elapse of a predetermined time from the start of arcing in the arcing period.

6. The method of controlling arc welding in claim 1, wherein the wire feeding speed in the arcing period is decreased to the base feeding speed at a point when the increased amount of the fed wire becomes equal to the decreased amount of the fed wire.

7. The method of controlling arc welding in claim 2, wherein the wire feeding speed is accelerated after a delay of a predetermined time from the start of arcing in the arcing period.

8. The method of controlling arc welding in claim 3, wherein the wire feeding speed is accelerated after a delay of a predetermined time from the start of arcing in the arcing period.

9. The method of controlling arc welding in claim 2, wherein the welding current is decreased to the value of base current after an elapse of a predetermined time from the start of arcing in the arcing period.

10. The method of controlling arc welding in claim 3, wherein the welding current is decreased to the value of base current after an elapse of a predetermined time from the start of arcing in the arcing period.

* * * * *